United States Patent [19]

Wyss

[11] Patent Number: 4,749,426

[45] Date of Patent: Jun. 7, 1988

[54] SILK SCREEN ROLLER APPLICATOR TECHNIQUE

[75] Inventor: Bill W. Wyss, Glendoar, Calif.

[73] Assignee: Avery International Corporation, Pasadena, Calif.

[21] Appl. No.: 582,524

[22] Filed: Feb. 22, 1984

[51] Int. Cl.⁴ .................. B65H 69/02; B65H 69/06
[52] U.S. Cl. ............................ 156/157; 156/272.4; 156/275.3; 156/308.4
[58] Field of Search ............. 156/157, 158, 308.4, 156/184, 275.3, 233.1, 272.2, 272.4; 269/8; 428/58, 900, 242, 57, 263, 285

[56] References Cited

U.S. PATENT DOCUMENTS

| 2,713,379 | 7/1955 | Sisson | 269/8 |
| 3,111,441 | 11/1963 | Gründel | 156/308.4 |
| 3,179,533 | 4/1965 | Rusch | 428/900 X |
| 3,205,121 | 9/1965 | Eichler et al. | 428/900 X |
| 3,402,089 | 9/1968 | Seaman | 156/497 X |
| 3,454,442 | 7/1969 | Heller, Jr. | 156/274.8 |
| 3,535,184 | 10/1970 | Schwartz | 156/157 X |
| 4,201,825 | 5/1980 | Ebneth | 428/263 |
| 4,410,575 | 10/1983 | Obayashi et al. | 156/308.4 |

FOREIGN PATENT DOCUMENTS

| 3146235 | 5/1983 | Fed. Rep. of Germany | 428/263 |
| 0601356 | 5/1948 | United Kingdom | 156/157 |

Primary Examiner—Donald E. Czaja
Assistant Examiner—Ramon R. Hoch
Attorney, Agent, or Firm—Poms, Smith, Lande & Rose

[57] ABSTRACT

Silk screen roller applicators, employed in a process which is also known as Screen Process Printing, are often used in the printing of labels and other materials. The present invention involves joining the edges of silk screen type material along a very narrow line, such as 1/32 inch, so that economies are achieved in printing and the associated use of paper, when the resultant applicator is formed. The two edges to be joined are each marked with at least two index marks, and these are aligned with corresponding light slots which are located on a base on either side of a fusing line. The silk screen type mesh which may be formed of a polyester coated with nickel, may be held down by magnetic plates, and the edges are accurately overlapped by aligning the index marks and the light guide slots, through the use of eccentric or similar mechanisms. A thin thread of nylon or other fusible material is tightly drawn between the edges of the fabric along the fusing line, with the fabric overlapped by about 1/32 inch. A pre-heated fusing bar is briefly lowered along the fusing line and promptly raised, after fusing the thread into the pores in both of the two edges of the silk screen type material.

13 Claims, 5 Drawing Sheets

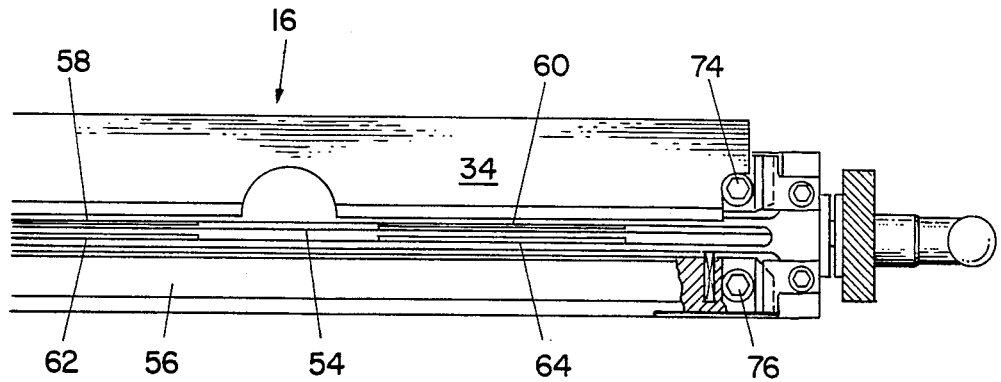
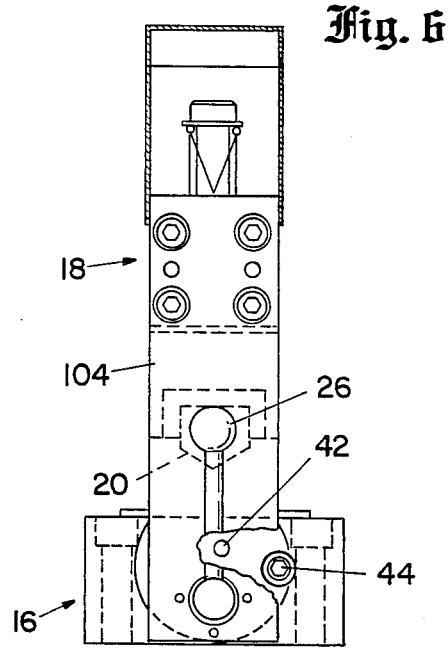

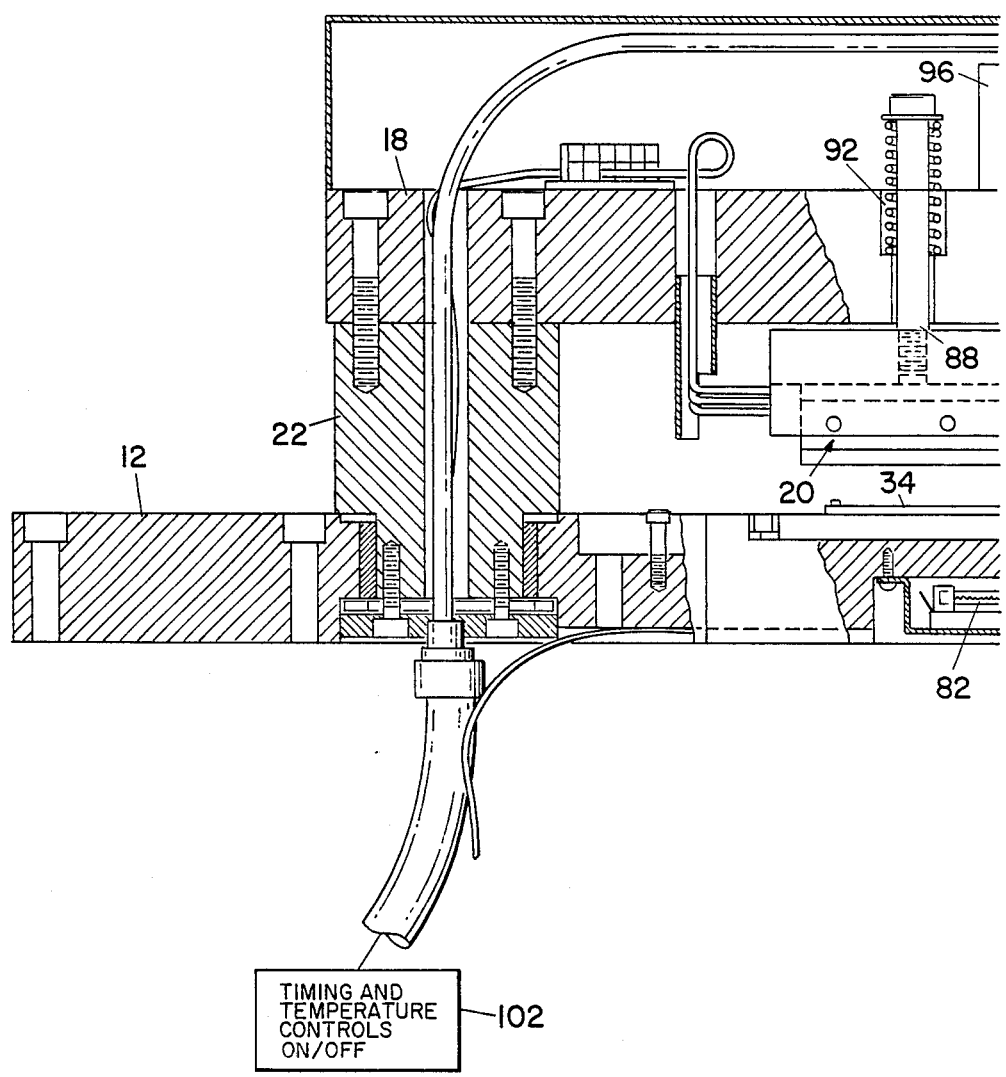

SILK SCREEN ROLLER APPLICATOR TECHNIQUE

FIELD OF THE INVENTION

The field of the invention relates to techniques of forming silk screen roller applicators, and more particularly to arrangements for securing the edges of the silk screen type fabric together.

BACKGROUND OF THE INVENTION

In the printing of labels or other material, it is common to use roller applicators having a silk screen type surface (also known as Screen Process Printing), where certain areas have been blocked, and the printing takes place by the flow of ink through the unblocked pores of the mesh material. In the formation of the roller applicator, it is necessary to take a sheet of silk screen type material and secure the edges together to form a cylindrical outer surface for the roller applicator. It has, up to the present, been the practice to use adhesives such as epoxy to secure the edges together, and this has unfortunately required the use of a distance around the circumference of the roller about ¼ inch. Particularly for the printing of small labels, which might only be an inch or two in extent, around the circumference of the roller applicator, the requirement that the labels be uniformly spaced, and the existence of a dead space of ¼ inch, means that all of the labels must be spaced apart by this distance, with resulting costly expenditure of paper and related materials.

Accordingly, a principal object of the present invention is to reduce the overlap required for securing the edges of silk screen type material for roller applicators together.

SUMMARY OF THE INVENTION

In accordance with the present invention, the silk screen type material used for roller applicators may have the edges secured together by the following steps:

(1) Overlapping the edges of the material by a very small distance such as 1/32 inch, 1/16 inch, or less;

(2) Firmly holding the edges of the material in their overlapped relationship;

(3) Extending a thread of plastic such as nylon or other similar, fusible material, tightly along and between the overlapped edges of the silk screen material; and (4) Applying a pre-heated element along the length of the overlapped edges of the silk screen type material to fuse the thread into the pores of the fabric.

In accordance with additional features of the invention, the silk screen type material may be formed of polyester material coated with nickel, and may be held in place by magnetic forces. In addition, the edges of the fabric may each be provided with index marks spaced back from the edge by a predetermined distance, and the base upon which the material is to be fused may be provided with guide points, which may include light slots on either side of the fusing line, for alignment with the index marks to obtain the precise narrow overlap of 1/32 inch or 1/16 inch, while the fusing operation is taking place. Following completion of the lapping process, the edges of the silk screen type material are secured to more rigid material to form the outer cylindrical part of a roller applicator.

One illustrative successful technique involves the use of a nylon thread, pre-heating a fusing rod to a temperature in the order of approximately 490 degrees to 500 degrees Fahrenheit, and applying the heated rod to the fusing line for approximately 1 to 3 seconds.

As mentioned above, it is desired that the spacing be between labels be relatively small, such as 1/32 inch. Using the new process, this type of spacing all of the way around the roller is possible, instead of the ¼ inch spacing between labels which had been required heretofore when epoxy was employed to secure the edges of the silk screen type material together. The difference between 1/32 inch and ¼ inch may not appear to be of great significance at an initial glance; however, when it is appreciated that the same spacing must be carried over for each of a large number of labels which are being printed as the roller applicator rotates, this difference is multiplied. Thus, if the labels are one inch long, and an additional 3/16 inch in spacing is required between each of these labels, this would be a loss of between 15% and 20% in terms of paper stock used, for example. From the foregoing analysis, it may be seen how important the reduction in overlap is, in the commercial environment.

Other objects, features and advantages of the invention will become apparent from the consideration of the following detailed description and from the accompanying drawings.

BRIEF DESCRIPTION OF THE DRAWINGS

FIGS. 4A and 4B are top views of the base portion of the apparatus of FIG. 1;

FIGS. 5A and 5B are side views in partial cross section, of the apparatus of FIG. 1; and FIG. 6 is an end view of the apparatus of FIG. 1 and FIGS. 4 and 5.

DETAILED DESCRIPTION

Figure 1:
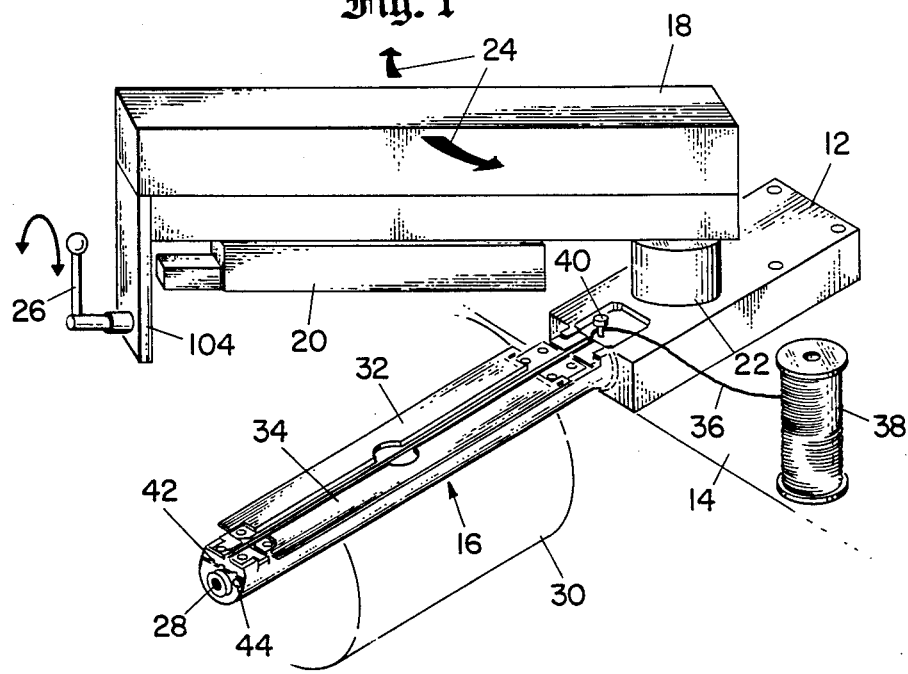
FIG. 1 is a perspective view of a silk screen type roller applicator lapping apparatus.

Referring more particularly to the drawings, FIG. 1 shows a lap forming apparatus for securing the edges of silk screen type material together, in accordance with the present invention. FIG. 1 includes a fixed base 12 which may be bolted to a table 14 with the arm assembly 16 extending beyond the edge of the table 14. The fixture head 18, which carries the fusing bar 20 is pivotally mounted on the member 22 and may be rotated as indicated by the arrows 24 into a position over the fixed extending arm assembly 16. When the fixture head 18 is oriented over the extending arm 16, the locking handle 26 is rotated to advance a tapered pin into the mating tapered recess 28.

The loop of silk screen type material is indicated schematically by the reference numeral 30 in FIG. 1. The edges which are to be fused together along the center of the arm 16, are held in place by the two magnetic plates 32 and 34 which are pulled down by sintered, high-strength, permanent magnet strips which are permanently imbedded into and secured to the arm assembly 16. The magnetic bars 32 and 34, however, are removable, and they are only located in position, when the edges of the silk screen mesh have been accurately aligned, in a manner to be discussed below, with the edges overlapping by only about 1/32 inch.

The nylon thread 36 from the spool 38 is wrapped several times around the thread guide 40, and then extends down along the central fusing line in the assembly 16 between the two overlapping edges of the silk screen type material, around a second thread guide 42, and is secured behind the thread lock 44 which may take the form of a rubber "O" ring held in place by a suitable bolt and washer.

Once the edges of the silk screen type material are in their proper place and the nylon thread extends down between the overlapping edges, the fixture head 18 is rotated into position and the handle 26 is actuated to lock the head 18 in its proper position over the arm 16. The controls are then actuated and the preheated fusing bar is advanced by air cylinders down into engagement with the upper surface of the upper layer of the silk screen material, held there for a short interval of about 2 seconds, and is then withdrawn. This serves to fuse the nylon thread into the apertures in the two overlapping edges, and securely holds these two edges together all with an overlap of less than 1/32 inch.

Incidentally, when using nickel plated polyester mesh in the order of 0.003 inch thick, and nylon thread, in the order of 0.010 inch thick, the fusing bar 20 is preferably heated to a temperature in the order of between 490 and 500 degrees Fahrenheit and is advanced and held against the upper nickel coated silk screen type material for a period of approximately 2 seconds. With other types of silk screen mesh and other types of fusible thread, it would be expected that somewhat different temperatures and dwell times would be used.

Figure 2A:
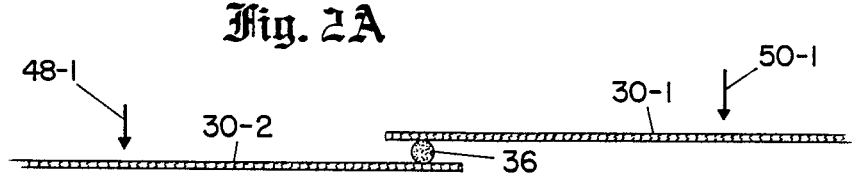
FIGS. 2A and 2B are diagrammatic showings of the steps involved in fusing the edges of the silk screen type material together.
Figure 2B:
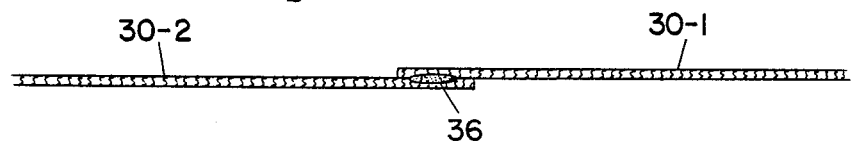

FIGS. 2A and 2B show diagramtically the position of the two edges 30-1 and 30-2 of the silk screen type polyester mesh which is plated with nickel. The nylon thread 36 is shown in FIG. 2A located precisely between the two layers of silk screen type material 30, and centered on the 1/32 inch overlap of the two edges of the material. Following the heating step, the two edges 30-1 and 30-2 are fused together, as indicated in FIG. 2B, with the nylon thread having been fused into the pores of the two edges, all well within the 1/32 inch overlap of the two edges.

Figure 3:
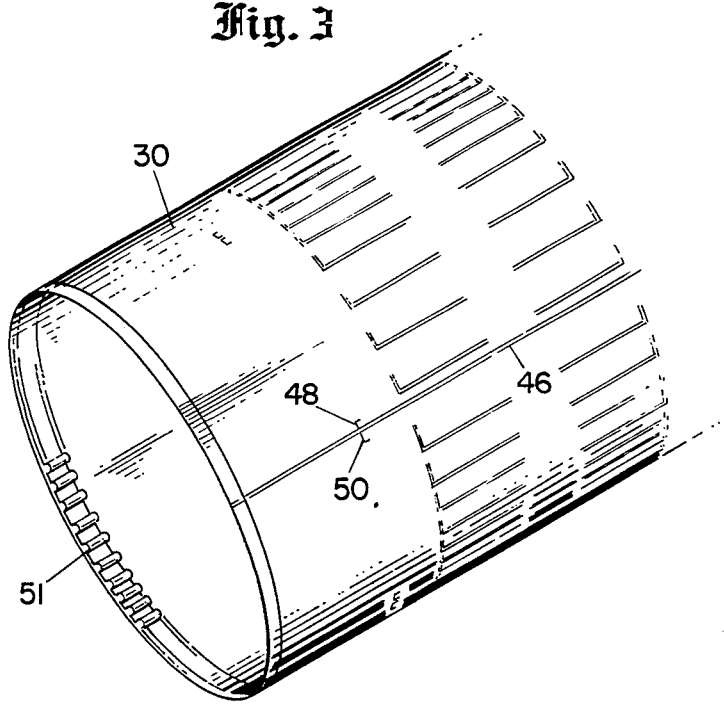
FIG. 3 is a diagrammatic showing of a portion of one type of silk screen roller applicator.

FIG. 3 is a partial view of a silk screen roller applicator showing the seam 46, and two index marks 48 and 50 located on two of the edges, spaced back a precise distance from the original edge of the fabric 30. These index marks are employed through alignment with certain underlying light slots on the arm assembly 16, as will be discussed in greater detail below. The index marks are located at the points designated 48-1 and 50-1 in FIG. 2A. After fusing, these index marks are precisely ¼ inch apart, and this is the spacing of the underlying light slots in the arm 16 of FIG. 1, which will be shown in the detailed mechanical drawings of FIGS. 4, 5 and 6. However, prior to the fusing of the nylon thread 36, each of the index marks 48 and 50 is located 9/64 inch from the edge of the silk screen type material or fabric, and the calculation of this distance is obvious from the diagrams of FIGS. 2A and 2B. Following the bonding of the lap joint 46, the loop of silk screen material 30 may be secured to less flexible or more rigid material 51, which may be of plastic or metal, to form the outer cylindrical component of a roller applicator.

Detailed mechanical drawings for the fixture shown in FIG. 1 are presented in FIGS. 4A, 4B, 5A, 5B and 6. In the detailed showings of FIGS. 4A, 4B, 5A, 5B and 6, many of the reference numerals employed in FIG. 1 will be employed to identify corresponding parts.

Figure 4A:
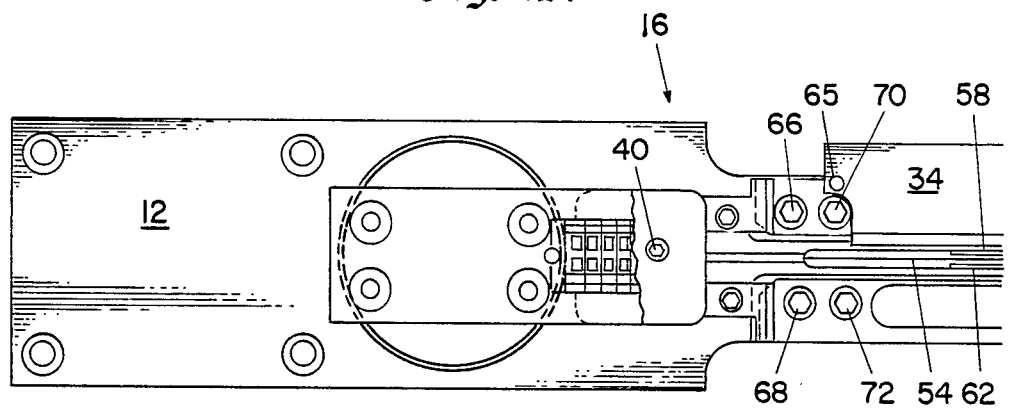

FIGS. 4A and 4B are views looking down on a fixture base 12 and the extending arm 16 of FIG. 1, but with the arm 16 extending to the right, rather than to the left as in FIG. 1. In FIG. 4B, the magnetic plate 34 is shown mounted on one side of the extending arm assembly 16, but the other magnetic plate 32 is not present on the other side of the central fusing line 54. Instead, the underlying sintered, permanent magnet strip 56 is visible. Also shown in FIG. 4B are the four light slots 58, 60, 62, and 64, with one pair of slots 58 and 60 being located above the fusing line 54 adjacent the edge of the magnetic plate 34, and the other pair of light slots 62, 64, being located below the center line 54 near the permanent magnetic strip 56.

In practice, one edge of the silk screen type material is initially located over the arm 16, from the top, as shown in FIG. 4B, and located approximately with the transversely extending portions of the L-shaped index marks such as shown at 48 and 50 in FIG. 3, over the light slots 58 and 60; and then the magnetic plate 34 is mounted on the arm 16 with a hole in plate 34 being located precisely by the index pin 66. The other edge of the silk screen type material is then secured in a similar manner to the lower side of the fixture 16 as shown in FIG. 4B overlying the magnetic strip material 56, and with an additional plate 32 (see FIG. 1) overlying the silk screen type material and holding the material precisely in place. Prior to the assembly of plate 32, a nylon thread may be extended around pin 40, and secured around pin 42 and behind the thread lock 44 so as to run precisely down the center of the arm 16 over one edge of the silk screen type material, and under the other edge, which may be mounted immediately after the stretching of the nylon thread around pins 40 and 42. The magnetic plates 32 and 34 together with the underlying magnetic strips are mounted for movement longitudinally, in accordance with the rotation of the eccentrics 66 and 68. These are employed to line up the inwardly directed portions of the L-shaped index marks 48 and 50, as shown in FIG. 3. The portions of the index marks 48, 50 and the two additional index marks toward the other side of the material 30, are then lined up with the light slots 58, 60, 62 and 64 by the adjustment of the four additional eccentrics 70, 72, 74, and 76 which are located at the two ends of the plates 32 and 34. Following precise alignment of the index marks with each other and with the light slots, the head 18 is rotated into position preparatory to fusing. The handle 26 is operated to lock the rotatable head 18 to the fixed arm 16 and, once the fusing bar 20 is up to its operating temperature, the fusing step may proceed.

Figure 5B:
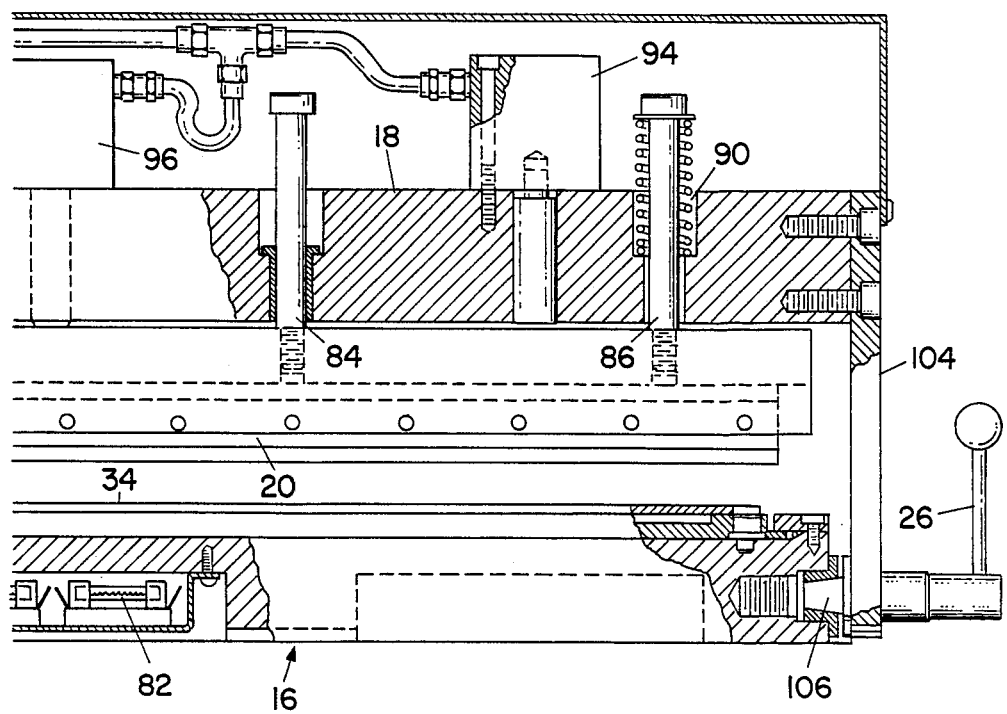

FIGS. 5A and 5B are views in partial cross section of the moveable fixture head 18 mounted over the fixed extended arm 16. In addition to the elements which have been disclosed hereinabove, FIGS. 5A and 5B are of interest in showing the lights 82 which illuminate the light slots mentioned above, and in disclosing in some greater detail the arrangements for mounting the fusing bar 20 in the upper pivotal fixture head 18. The fusing bar 20 is mounted for easy movement up and down on the bolts 84, 86 and 88. The two springs 90 and 92 normally bias the fusing bar 20 to its "up" position out of contact and spaced from the fusing line between magnetic plates 32 and 34. The air cylinders 94 and 96 are operated together to depress the fusing bar 20 into engagement with the overlapped and accurately positioned edges of the silk screen fabric material, to fuse the nylon thread as discussed above. A temperature and timing control unit 102 is provided for bringing the fusing bar 20 up to the proper temperature, and for actuating the air cylinders 94 and 96 to depress the fusing bar 20 for precisely the correct period of time. In this regard, departures from the optimum temperature and timing will cause a weak joint which may fail; and, on the other hand, overheating or prolonged dwell of the fusing bar could result in the melting of the polyester mesh from which the silk screen material is formed.

The end plate 104 is shown in FIG. 5B overlying the end of the arm 16, and with the tapered element 106 engaging a corresponding tapered recess in arm 16 as a result of operation of the handle 26

FIG. 6 shows an end-view of the arm 16 and the pivotal assembly 18, with the plate 104 in the foreground. The pin 42, around which the nylon thread is extended, and the locking member 44 are also shown in FIG. 6. With regard to the member 44, it includes a central bolt, a washer, and an "O" ring secured below the washer for ease in frictionally gripping the nylon thread 36, as shown in FIG. 1.

As mentioned above, it is preferred that the overlap of the two edges of the silk screen type material be in the order of 1/32 inch, as high strength laps using this amount of overlap have proved successful, and this is the type of spacing which is normally expected and desired between labels in normal production runs. A somewhat lesser amount of overlap may be used if desired, but with possible weakening of the joint if too thin an overlap is employed. It is noted in passing that the silk screen mesh material which is employed is woven polyester fiber, with each strand being in the order of 0.001 inch in diameter. This polyester mesh is nickel plated with a very thin coating of nickel. It is then provided with an impermeable flexible plastic film over the areas of the silk screen material where it is desired that no printing occur. This is accomplished by a photographic process known per se. The index marks, which may be "L" shaped in configuration, are preferably located on the silk screen material at this point in the process. It is understood that the softening point for nylon is in the order of 280 or 290 degrees Fahrenheit. On the other hand, it is understood that the polyester fibers from which the silk screen type material is made have a slightly higher softening point by 10 or 20 degrees. It is important that the temperature of the fusing bar at the time of dwell be adjusted properly so that the nylon material is fused and penetrates the pores of the mesh, but that the polyester fibers are not damaged. It may be noted also that the two second dwell time is relatively short time; however, in experimentation with lower temperatures for the fusing bar, and a somewhat longer dwell time, it was determined that significantly weaker lapping joints were obtained. It is also to be understood that the present invention is not limited to the use of the precise materials disclosed hereinabove, but that threads of other material, and meshes of different other material, may be employed. For example, stainless steel mesh could be used instead of the nickel plated polyester silk screen type material. In addition, threads made of other plastics could be employed, instead of using nylon. In each case, the appropriate temperature for fusing, and the desired dwell time would be determined in order to maximize the strength of the lap joint, and avoid damage to the silk screen mesh of the particular material employed.

For completeness, mention is made of W. C. Heller, Jr., U.S. Pat. No. 3,454,442, in which two sheets of polyethylene are joined using a rod or "agent" of cylindrical form between the two members to be joined, and employing dielectric heating to soften or melt the "agent" which is located between the two sheets to be joined. The patent does not, however, appear to disclose any arrangements for making a very thin joint, of the type contemplated in the present invention, nor is there any disclosure of direct heating or the use of silk screen type or mesh materials.

It is to be understood that the foregoing detailed description and the accompanying drawings relate to one illustrative preferred embodiment of the invention. However, departures from the specific details and arrangements disclosed hereinabove may be made. Thus, by way of specific example, but not of limitation, other materials may be employed for both the mesh and for the fusible thread. In addition, other mechanical and optical arrangements may be employed to provide the precise and accurate overlap of the edges and the desired application of the fusing bar to the material. Also, instead of magnetically clamping the edges, they could be mechanically clamped. Accordingly, the present invention is not limited to that precisely as shown in the drawings or described in the detailed description.

What is claimed is:

1. A method for joining the edges of silk screen type material having a magnetic metal on the surface thereof for use in a roller applicator, comprising the steps of:
   forming at least two index marks spaced back a predetermined distance at both edges of the screen material to be secured together;
   providing at least two guide points on a base member on each side of a fusing line along which the edges are to be secured together;
   aligning the two index marks at each of the first and second screen fabric edges with the two guide points on one side and on the other side, respectively, of said fusing line, so that the edges overlap by not more than one-sixteenth of an inch;
   holding the edges of said screen fabric with said overlap with magnetic force leaving said fusing line open;
   stretching a thread of fusable material accurately aligned along said fusing line between the overlapping edges of screen fabric; and
   moving a heated fusing bar into brief engagement with the outer screen fabric edge to heat said metal on the surface thereof and fuse said thread through the mesh openings of both of said edges of the screen fabric;
   whereby the edges of said screen material are firmly secured together along a very narrow line, with resultant economies in repetitive printing and associated use of paper stock.

2. A method as set forth in claim 1 wherein said thread of fusable material is formed of nylon, wherein said fusing bar is heated to a temperature in the order of 490 degrees to 500 degrees Fahrenheit, and wherein said fusing bar is held in engagement with said overlapped silk screen material for about one to three seconds.

3. A method as defined in claim 1 including the step of clamping each edge of said screen fabric between a permanent magnet and a plate of magnetic material, and moving the clamped screen fabric to its final alignment position by the rotation of eccentric mechanisms.

4. A method as defined in claim 1 including the actuation of at least one fluid cylinder actuator to move said heated fusing bar.

5. A method as defined in claim 1 including the step of directing light upwardly through at least two spaced light slots, and aligning said index marks with said light slots.

6. A method as defined in claim 1 including the step of forming each of said index marks in an L-shaped configuration, with one arm of the "L" extending parallel to, and the other arm extending perpendicular to the edges of the silk screen type material.

7. A method as set forth in claim 1 including the additional step of securing the outer edges of the mesh material to more rigid material to form the outer cylindrical component of a roller applicator.

8. A method for joining the edges of silk screen type fabric material having a magnetic metal on the surface thereof for use in a roller applicator using an apparatus having an outwardly extending base member and a movable fusing bar, comprising the steps of:

forming at least two index marks spaced back a predetermined distance at both edges of the screen material to be secured together;
providing at least two guide points on an outwardly extending base member on each side of a fusing line along which the edges are to be secured together;
aligning the two index marks at each of the first and second screen fabric edges with the two guide points on one side and on the other side, respectively, of said fusing line so that the edges overlap but not more than one-sixteenth of an inch;
holding the edges of said screen fabric with said overlap in place with magnetic force, leaving said fusing line open;
stretching a thread of fusable material accurately aligned along said fusing line between the overlapping edges of screen fabric;
accurately aligning a fusing bar by moving it into position aligned with said base member;
moving the heated fusing bar into brief engagement with the outer screen fabric edge to heat said metal on the surface thereof and fuse said thread through the mesh openings of both of said edges of the screen fabric; and
removing the resultant closed loop silk screen material from the apparatus by sliding it off the outwardly extending end of the base member, after the fusing bar has been moved away therefrom;
whereby the edges of said screen material are firmly secured together along a very narrow line, with resultant economies in repetitive printing and associated use of paper stock.

9. A method as set forth in claim 8 wherein said thread of fusible material is formed of nylon, wherein said fusing bar is heated to a temperature in the order of 490 degrees to 500 degrees Fahrenheit, and wherein said fusing bar is held in engagement with said overlapped silk screen material for about one to three seconds.

10. A method as defined in claim 8 including the step of clamping each edge of said screen fabric between a permanent magnet and a plate of magnetic material, and moving the clamped screen fabric to its final alignment position by the rotation of eccentric mechanisms.

11. A method as defined in claim 8 including the actuation of at least one fluid cylinder actuator to move said heated fusing bar.

12. A method as set forth in claim 8 including the additional step of securing the outer edges of the mesh material to more rigid material to form the outer cylindrical component of a roller applicator.

13. A method for joining the edges of silk screen type material having metal on the surface thereof for use in a roller applicator, comprising the steps of:

forming at least two index marks spaced back a predetermined distance at both edges of the screen material to be secured together;
providing at least two guide points on a base member on each side of a fusing line along which the edges are to be secured together;
coarsely aligning the two index marks at each of the first and second screen fabric edges with the two guide points on one side and on the other side, respectively, of said fusing line, so that the edges overlap by not more than one-sixteenth of an inch;
separately clamping each of the edges of said screen fabric with said overlap in place leaving said fusing line open;
shifting at least one of said clamped edges slightly relative to said base member and relative to the other of said clamped edges to provide final accurate alignment of said index marks and said guide points;
stretching a thread of fusable material accurately aligned along said fusing line between the overlapping edges of screen fabric; and
moving a heated fusing bar into brief engagement with the outer screen fabric edge to heat said metal on the surface thereof and fuse said thread through the surface of both of said edges of the screen fabric;
whereby the edges of said screen material are firmly secured together along a very narrow line, with resultant economies in repetitive printing and associated use of paper stock.

* * * * *